United States Patent
Nguyen et al.

(10) Patent No.: US 7,131,062 B2
(45) Date of Patent: Oct. 31, 2006

(54) SYSTEMS, METHODS AND COMPUTER PROGRAM PRODUCTS FOR ASSOCIATING DYNAMICALLY GENERATED WEB PAGE CONTENT WITH WEB SITE VISITORS

(75) Inventors: Binh Q. Nguyen, Cary, NC (US); Sandeep Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 09/207,945

(22) Filed: Dec. 9, 1998

(65) Prior Publication Data

US 2002/0002569 A1 Jan. 3, 2002

(51) Int. Cl.
G06F 15/00 (2006.01)

(52) U.S. Cl. ............... 715/513; 715/501.1; 705/14; 709/228

(58) Field of Classification Search ........... 707/517, 707/513, 514, 515, 501, 500, 501.1; 709/219, 709/228; 705/26–27, 14; 715/513, 501.1, 715/500
See application file for complete search history.

(56) References Cited

U.S. PATENT DOCUMENTS

| | | | |
|---|---|---|---|
| 5,530,852 A | 6/1996 | Meske, Jr. et al. | 709/206 |
| 5,737,619 A | 4/1998 | Judson | 707/500 |
| 5,745,909 A | 4/1998 | Perlman et al. | 707/513 |
| 5,781,739 A | 7/1998 | Bach et al. | 709/200.57 |
| 5,796,952 A | 8/1998 | Davis et al. | 709/224 |
| 5,835,718 A | * 11/1998 | Blewett | 709/218 |
| 5,892,917 A | * 4/1999 | Myerson | 709/224 |

(Continued)

OTHER PUBLICATIONS

Memorandum, *The MD5 Message–Digest Algorithm*, R. Rivest, MIT Laboratory for Computer Science and RSA Data Security, Inc. (Apr. 1992).
http://web.archive.org/web/20000302134918/http://www.nypost.com/, Mar. 2, 2000.
http://web.archive.org/web/20000302110445/http://www.nypost.com, Mar. 2, 2000.
http://web.archive.org/web/2000030208270/http://www.nypost.com/, Mar. 1, 2000.
http://web.archive.org/web/19991114030419/http://www.nypost.com/, Nov. 13, 1999.
Quintana, Y, "Design of an object–oriented multimedia database for personalized multimedia news," IEEE, 1996, pp. 282–285, vol. 1.
Copy of Specification and Drawings of Application Ser. No. 09/537,363 Filed: Mar. 29, 2000.

*Primary Examiner*—Stephen S. Hong
*Assistant Examiner*—Thu V. Huynh
(74) *Attorney, Agent, or Firm*—Myers Bigel Sibley & Sajovec; A. Bruce Clay

(57) ABSTRACT

Systems, methods and computer program products are provided for associating dynamically generated Web page content with a user who requests a Web page from a Web server. Upon receiving a user request for a Web page via a Web client in communication with the Web server, a Web server records the user request within a Web server log. The requested Web page is then dynamically generated using a template for the requested Web page and one or more content objects having respective unique identifiers associated therewith. The stored record of the user request is then appended with each identifier for respective content objects included within the displayed Web page.

48 Claims, 2 Drawing Sheets

U.S. PATENT DOCUMENTS

| | | | |
|---|---|---|---|
| 5,907,704 A | 5/1999 | Gudmundson et al. | 717/100 |
| 5,930,803 A | 7/1999 | Becker et al. | 707/104 |
| 5,933,811 A * | 8/1999 | Angles et al. | 705/14 |
| 5,948,061 A * | 9/1999 | Merriman et al. | 709/219 |
| 5,958,008 A * | 9/1999 | Pogrebisky et al. | 709/223 |
| 5,960,429 A * | 9/1999 | Peercy et al. | 707/5 |
| 5,974,421 A * | 10/1999 | Krishnaswamy et al. | 707/103 R |
| 5,974,455 A * | 10/1999 | Monier | 709/223 |
| 5,987,480 A * | 11/1999 | Donohue et al. | 707/501 |
| 5,991,735 A * | 11/1999 | Gerace | 705/10 |
| 5,999,912 A * | 12/1999 | Wodarz et al. | 705/14 |
| 6,029,182 A | 2/2000 | Nehab et al. | 715/523 |
| 6,092,100 A * | 7/2000 | Berstis et al. | 709/203 |
| 6,108,637 A * | 8/2000 | Blumenau | 705/7 |
| 6,108,703 A * | 8/2000 | Leighton et al. | 709/226 |
| 6,119,170 A * | 9/2000 | Schoffelman et al. | 709/213 |
| 6,128,655 A * | 10/2000 | Fields et al. | 709/219 |
| 6,128,663 A * | 10/2000 | Thomas | 709/228 |
| 6,169,997 B1 * | 1/2001 | Papierniak et al. | 707/501 |
| 6,178,461 B1 * | 1/2001 | Chan et al. | 709/219 |
| 6,185,614 B1 * | 2/2001 | Cuomo et al. | 709/224 |
| 6,219,699 B1 * | 4/2001 | McCloghrie et al. | 370/351 |
| 6,230,196 B1 * | 5/2001 | Guenthner et al. | 709/223 |
| 6,256,028 B1 * | 7/2001 | Sanford et al. | 345/353 |
| 6,311,211 B1 * | 10/2001 | Shaw et al. | 709/206 |
| 6,449,599 B1 * | 9/2002 | Payne et al. | 705/27 |
| 6,490,601 B1 | 12/2002 | Markus et al. | 715/507 |
| 2001/0032254 A1 * | 10/2001 | Hawkins | 709/219 |
| 2003/0093384 A1 * | 5/2003 | Durst et al. | 705/64 |

* cited by examiner

SYSTEMS, METHODS AND COMPUTER PROGRAM PRODUCTS FOR ASSOCIATING DYNAMICALLY GENERATED WEB PAGE CONTENT WITH WEB SITE VISITORS

FIELD OF THE INVENTION

The present invention relates generally to Web pages and, more particularly, to Web pages containing dynamically generated content.

BACKGROUND OF THE INVENTION

The Internet is a worldwide decentralized network of computers having the ability to communicate with each other. The Internet has gained broad recognition as a viable medium for communicating and interacting across multiple networks. The World Wide Web (Web) was created in the early 1990's and is comprised of server-hosting computers (Web servers) connected to the Internet that have hypertext documents or Web pages stored therewithin. Web pages are accessible by client programs (i.e., Web browsers) utilizing the Hypertext Transfer Protocol (HTTP) via a Transmission Control Protocol/Internet Protocol (TCP/IP) connection between a client-hosting device and a server-hosting device. While HTTP and hypertext documents are the prevalent forms for the Web, the Web itself refers to a wide range of protocols including Secure Hypertext Transfer Protocol (HTTPS), File Transfer Protocol (FTP), Gopher, and content formats including plain text, Extensible Markup Language (XML), as well as image formats such as Graphics Interchange Format (GIF) and Joint Photographic Experts Group (JPEG).

Specific to the Web, a Web server is a computer program (housed in a computer) that serves requested Web pages and files. A Web client is a requesting program associated with a user. A Web browser is an exemplary Web client for use in requesting Web pages and files from Web servers.

A Web site is conventionally a collection of Web pages and files related to a particular subject that includes a beginning file called a home page. A large Web site may reside on a number of geographically-dispersed Web servers. The Web site of the International Business Machines Corporation (www.ibm.com), for example, consists of thousands of Web pages and files spread out over various Web servers in locations world-wide.

As is known to those skilled in this art, a Web page is conventionally formatted via a standard page description language such as HyperText Markup Language (HTML), which typically contains text and graphics references and can reference sound, animation (e.g., via programs and/or scripts), and video data. HTML provides for basic document formatting and allows a Web content provider to specify hypertext links (typically manifested as highlighted text) to other Web servers and files. When a user selects a particular hypertext link, a Web browser reads and interprets an address, called a Uniform Resource Locator (URL) associated with the link, connects the Web browser with the Web server at that address, and makes an HTTP request for the file identified in the link. The Web server then sends the requested file to the client in HTML format which the Web browser interprets and displays to the user.

Exemplary Web browsers include Netscape Navigator® (Netscape Communications Corporation, Mountain View, Calif.) and Internet Explorer® (Microsoft Corporation, Redmond, Wash.). Web browsers typically provide a graphical user interface for retrieving and viewing information, applications and other resources hosted by Web servers.

In the business world of yesteryear, shopkeepers often knew their customers by name. Typically, a shopkeeper knew his/her customers' preferences with respect to the products and services offered by the shopkeeper. By knowing information about his/her customers' preferences, a shopkeeper could more adequately meet customer needs and ensure greater business success. For the same reason today, Web site owners would like to learn about the preferences of their customers. Unfortunately, Web site owners typically do not personally know customers who access their Web sites via the Internet.

Many Web pages contain dynamically generated content. Dynamically generated content allows Web site owners to select the content for a delivered Web page, as well as manipulate the placement of that content within the Web page, for various purposes. It would be desirable to collect information about the effectiveness of content selection and placement each time a Web visitor comes to a Web site, for example by measuring the length of time a visitor views particular content within a Web page. By knowing this type of information, a Web site owner can determine the efficacy of content presentation on the Web site, and can tailor content to particular users. Unfortunately, current Web servers may not have the ability to collect information about the content that a Web site visitor views.

SUMMARY OF THE INVENTION

In view of the above discussion, it is an object of the present invention to facilitate personalized content delivery to Web site visitors.

It is another object of the present invention to enhance the efficacy of information delivery to Web site visitors.

It is another object of the present invention to facilitate collecting information about the preferences of Web site visitors.

It is another object of the present invention to facilitate collecting information about dynamically generated Web content requested by Web site visitors.

These and other objects of the present invention are provided by systems, methods and computer program products for associating dynamically generated Web page content with a user who requests a Web page from a Web server. Upon receiving a user request for a Web page via a Web client in communication with the Web server, a Web server records the user request within a Web server log. The requested Web page is then dynamically generated using a template for the requested Web page and one or more content objects. Exemplary content objects include, but are not limited to, text files, audio files, video files, image files, and hyperlinks. Each content object has a respective unique identifier associated therewith. The stored record of the user request is then appended with each identifier for respective content objects included within the displayed Web page.

The present invention is advantageous because a plurality of stored user request records appended with content object identifiers, according to the present invention, can be analyzed to determine the type of content a user views as well as the time spent viewing the content. Furthermore, the efficacy of certain content within a viewed Web page can be determined via the present invention. For example, if particular content is generally ignored by users (e.g., users do not follow hyperlinks contained within the content), a Web site owner can relocate or reformat the particular content.

The present invention stems from the realization that requests for Web pages made by a Web site visitor are conventionally accompanied by some type of user information, such as who the visitor is, the visitor's location, the type of Web browser utilized, a time stamp, and the like. This user information is conventionally stored within a Web server log file. Unfortunately, user information provided with a Web page request may not provide a Web site owner with relevant information about a visitor's preferences. Unless visitors are requested to fill out a form detailing their preferences, Web site owners typically do not have a way of gathering such information about their Web site visitors.

DETAILED DESCRIPTION OF THE INVENTION

Figure 1:
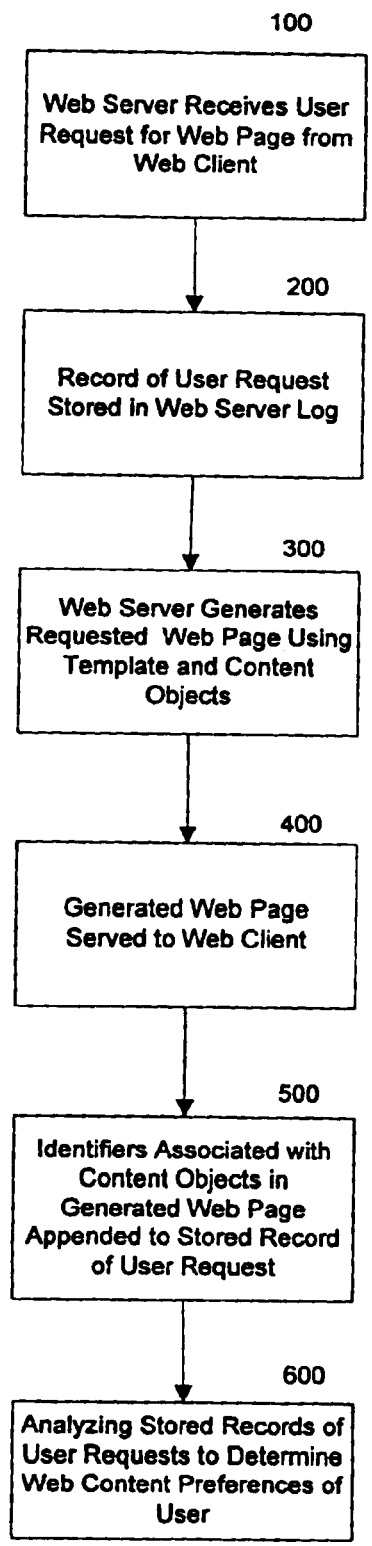
FIG. 1 schematically illustrates operations according to the present invention for associating dynamically generated Web page content with users requesting Web pages from a Web server.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment, or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as JAVA®, Smalltalk or C++. However, the computer program code for carrying out operations of the present invention may also be written in conventional procedural programming languages, such as the "C" programming language, or in a functional (or fourth generation) programming language such as Lisp, SML, or Forth. The program code may execute entirely on a web server, or it may execute partly on a web server and partly on a remote computer (i.e., a user's web client). In the latter scenario, the remote computer may be connected to the web server through a LAN or a WAN, or the connection may be made to an external computer (for example, through the Internet using an Internet Service Provider).

The present invention is described below with reference to flowchart illustrations of methods, apparatus (systems), and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring now to FIG. 1, operations according to the present invention for associating dynamically generated Web page content with a user who requests a Web page from a Web server are illustrated. Initially, a Web server receives a user request for a Web page via a Web client in communication with the Web server (Block 100). A record of the user's Web page request is stored within a Web server log (Block 200). This log record includes the URL of the requested Web page, the requesting user's identity, and the time stamp of the request. The Web server then dynamically generates the requested Web page using a template and one or more content objects (Block 300). Each content object used to generate the requested Web page has a unique identifier associated therewith. The generated Web page is then served to the Web client (Block 400). The unique identifier for each content object included within the served Web page is appended to the stored user request record (Block 500). Each time a user requests additional content, the respective identifiers associated with the requested content object(s) are appended to the respective user request record, along with the time stamp of that content request. Finally, because time stamps are conventionally a part of a user request record, the time a user spends viewing particular content also can be determined. When a user requests a new Web page, the server records the time of this request with the associated request record for the user's previous Web page request. In this way, a user is assumed to have viewed content from the time it was delivered (and a corresponding entry is made to the request record) to the time that the user initiates a new Web page request (and the request time is recorded in that request record).

Stored records of user requests can be analyzed to determine user preferences with respect to Web page content (Block 600). The choices of Web pages requested by the user, combined with information about what content was presented on each requested Web page and the amount of time spent viewing that content, can provide insight into the preferences of a user. Furthermore, the efficacy of certain content within a viewed Web page can be determined via the present invention. For example, if particular content is generally ignored by users (e.g., users do not follow hyperlinks and, consequently, request corresponding Web pages, contained within the content), a Web site owner can relocate or reformat the particular content.

Figure 2:
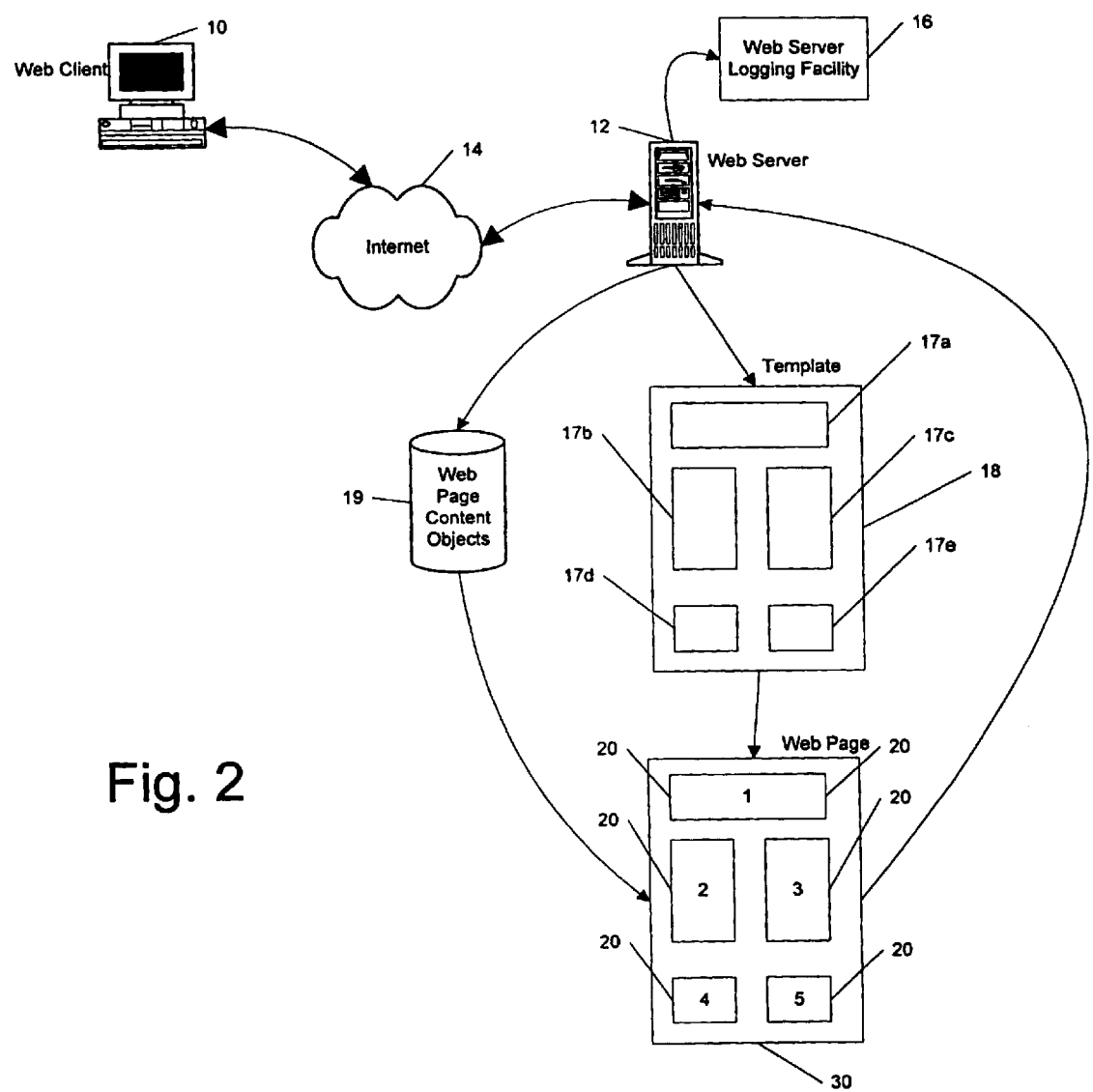
FIG. 2 schematically illustrates a system in which the present invention can be implemented.

Referring now to FIG. 2, a system within which the present invention may be implemented is schematically illustrated. A Web client 10 is in communication with a Web server 12 via a computer network, such as the Internet 14. The Web server 12 includes a logging facility 16 for storing records of user requests for Web pages. Web server logging facilities are well understood by those skilled in this art and need not be described further herein.

The Web server 12 is configured to dynamically generate a requested Web page 30 using a template 18 and one or more Web page content objects. The template 18 defines the layout of content objects within the Web page 30 when displayed within a Web client (i.e., Web browser). Each element of a Web page, including, but not limited to, divisions, sections, headings, paragraphs, images, lists, tables, and hyperlinks, may represented by a content object; in addition, a content object may include audio and video files. It is understood, however, that a single content object may represent one or more of these Web page elements. The illustrated template 18 includes a plurality of fields 17a–17e that indicate where a respective content object is to be displayed within a generated Web page.

In the illustrated embodiment, content objects are stored within a database 19 that is accessible by the Web server 12. However, it is to be understood that content objects 20 can be stored in a file system, as well. When a user request is received for the Web page 30, the Web server 12 retrieves the template 18 and content objects and generates the Web page 30. Dynamic generation of Web pages using templates and content objects is known to those skilled in this art and need not be described further herein.

Each content object 20 in the generated Web page 30 has a unique identifier (1–5) associated therewith, as illustrated. Content objects are preferably assigned a unique identifier prior to receiving a request for a Web page. This facilitates saving processor time and speed during run time when Web pages are dynamically generated. Preferably a unique identifier is generated using a hashing function. As is known by those skilled in this art, hashing is the transformation of a string of characters into a usually shorter fixed-length value or key that represents the original string. A well known hashing function that is particularly suitable for generating unique identifiers for content objects is the Message Digest 5 (MD5) hashing function. MD5 was authored by Ronald L. Rivest, Massachusetts Institute of Technology, Laboratory for Computer Science, Cambridge, Mass., and is described in the Network Working Group Request for Comments 1321 (RFC 1321), Information Sciences Institute, University of Southern California, Marina del Rey, Calif., April 1992, which is incorporated herein by reference in its entirety. In alternative embodiments of the present invention, the content object's unique identifier may be formed as a URL or Uniform Resource Identifier (URI), optionally appended with additional unique identifying information.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of associating dynamically generated Web page content with a user who requests a Web page from a Web server, wherein the user makes the Web page request via a Web client in communication with the Web server, the method comprising the following steps performed by the Web server:

storing a record of the user request within a Web server log;

generating the requested Web page, wherein the generated Web page includes a content object having a unique identifier associated therewith, wherein the unique identifier is generated via a hashing function;

serving the generated Web page to the Web client; and appending the stored record of the user request with the unique identifier associated with the content object included within the generated Web page.

2. A method according to claim 1 wherein the record of the request includes information that identifies the user.

3. A method according to claim 1 wherein the step of generating the requested Web page comprises the steps of:

retrieving a layout template for the requested Web page, wherein the layout template defines how content objects are displayed within the requested Web page;

retrieving the content object; and combining the content object and the layout template to produce the requested Web page.

4. A method according to claim 3 wherein the content object is selected from the group consisting of text files, audio files, video files, image files, and hyperlinks.

5. A method according to claim 1 further comprising the step of analyzing a plurality of stored user request records to determine Web content preferences of a user.

6. A method according to claim 1 further comprising the step of appending the stored record of the user request with a time stamp for a subsequent user request for a Web page.

7. A method according to claim 6 further comprising the step of determining a length of time the user views the generated Web page using time stamps within the stored record.

8. A method of associating dynamically generated Web page content with a user who requests a Web page from a Web server, wherein the user makes the Web page request via a Web client in communication with the Web server, the method comprising the following steps performed by the Web server:

storing a record of the user request within a Web server log;

generating the requested Web page, wherein the generated Web page includes first and second content objects having respective unique first and second identifiers associated therewith, wherein the unique first and second identifiers are generated via a hashing function, comprising the steps of:

retrieving a layout template for the requested Web page, wherein the layout template defines how content objects are displayed within the requested Web page;

retrieving the first and second content objects; and combining the first and second content objects and the layout template to produce the requested Web page;

serving the generated Web page to the Web client; and appending the stored record of the user request with the first and second unique identifiers associated with the first and second content objects included within the generated Web page.

9. A method according to claim 8 wherein the record of the request includes information that identifies the user.

10. A method according to claim 8 wherein the first and second content objects are selected from the group consisting of text files, audio files, video files, image files, and hyperlinks.

11. A method according to claim 8 further comprising the step of analyzing a plurality of stored user request records to determine Web content preferences of a user.

12. A method of collecting information about the preferences of Web site visitors comprising the step of:

associating dynamically generated Web page content with a user who requests a Web page from a Web server via a Web client in communication with the Web server, comprising the following steps performed by the Web server:

storing a record of the user request within a Web server log;

generating the requested Web page, wherein the generated Web page includes a content object having a unique identifier associated therewith, wherein the unique identifier is generated via a hashing function;

serving the generated Web page to the Web client; and appending the stored record of the user request with the unique identifier associated with the content object included within the generated Web page.

13. A method according to claim 12 wherein the record of the request includes information that identifies the user.

14. A method according to claim 12 wherein the step of generating the requested Web page comprises the steps of:

retrieving a layout template for the requested Web page, wherein the layout template defines how content objects are displayed within the requested Web page;

retrieving the content object; and combining the content object and the layout template to produce the requested Web page.

15. A method according to claim 14 wherein the content object is selected from the group consisting of text files, audio files, video files, image files, and hyperlinks.

16. A method according to claim 12 further comprising the step of analyzing a plurality of stored user request records to determine Web content preferences of a user.

17. A system for associating dynamically generated Web page content with a user who requests a Web page from a Web server, wherein the user makes the Web page request via a Web client in communication with the Web server, comprising:

means for storing a record of the user request within a Web server log;

means for generating the requested Web page, wherein the generated Web page includes a content object having a unique identifier associated therewith, wherein the unique identifier is generated via a hashing function;

means for serving the generated Web page to the Web client; and means for appending the stored record of the user request with the unique identifier associated with the content object included within the generated Web page.

18. A system according to claim 17 wherein the record of the request includes information that identifies the user.

19. A system according to claim 17 wherein the means for generating the requested Web page comprises:

means for retrieving a layout template for the requested Web page, wherein the layout template defines how content objects are displayed within the requested Web page;

means for retrieving the content object; and means for combining the content object and the layout template to produce the requested Web page.

20. A system according claim 19 wherein to the content object is selected from the group consisting of text files, audio files, video files, image files, and hyperlinks.

21. A system according to claim 17 further comprising means for analyzing a plurality of stored user request records to determine Web content preferences of a user.

22. A system according to claim 17 further comprising means for appending the stored record of the user request with a time stamp for a subsequent user request for a Web page.

23. A system according to claim 22 further comprising means for determining a length of time the user views the generated Web page using time stamps within the stored record.

24. A system for associating dynamically generated Web page content with a user who requests a Web page from a Web server, wherein the user makes the Web page request via a Web client in communication with the Web server, comprising:

means for storing a record of the user request within a Web server log;

means for generating the requested Web page, wherein the generated Web page includes first and second content objects having respective unique first and second identifiers associated therewith, wherein the unique first and second identifiers are generated via a hashing function, comprising:

means for retrieving a layout template for the requested Web page, wherein the layout template defines how content objects are displayed within the requested Web page;

means for retrieving the first and second content objects; and means for combining the first and second content objects and the layout template to produce the requested Web page;

means for serving the generated Web page to the Web client; and means for appending the stored record of the user request with the first and second unique identifiers associated with the first and second content objects included within the generated Web page.

25. A system according to claim 24 wherein the record of the request includes information that identifies the user.

26. A system according to claim 24 wherein the first and second content objects are selected from the group consisting of text files, audio files, video files, image files, and hyperlinks.

27. A system according to claim 24 further comprising means for analyzing a plurality of stored user request records to determine Web content preferences of a user.

28. A system for collecting information about the preferences of Web site visitors comprising:

means for associating dynamically generated Web page content with a user who requests a Web page from a Web server via a Web client in communication with the Web server, comprising:

means for storing a record of the user request within a Web server log;

means for generating the requested Web page, wherein the generated Web page includes a content object having a unique identifier associated therewith, wherein the unique identifier is generated via a hashing function;

means for serving the generated Web page to the Web client; and means for appending the stored record of the user request with the unique identifier associated with the content object included within the generated Web page.

29. A system according to claim 28 wherein the record of the request includes information that identifies the user.

30. A system according to claim 28 wherein the means for generating the requested Web page comprises:

means for retrieving a layout template for the requested Web page, wherein the layout template defines how content objects are displayed within the requested Web page;

means for retrieving the content object; and means for combining the content object and the layout template to produce the requested Web page.

31. A system according to claim 30 wherein the content object is selected from the group consisting of text files, audio files, video files, image files, and hyperlinks.

32. A system according to claim 28 further comprising means for analyzing a plurality of stored user request records to determine Web content preferences of a user.

33. A computer program product for associating dynamically generated Web page content with a user who requests a Web page from a Web server, wherein the user makes the Web page request via a Web client in communication with the Web server, the computer program product comprising a computer usable storage medium having computer readable program code means embodied in the medium, the computer readable program code means comprising:

computer readable program code means for storing a record of the user request within a Web server log;

computer readable program code means for generating the requested Web page, wherein the generated Web page includes a content object having a unique identifier associated therewith, wherein the unique identifier is generated via a hashing function;

computer readable program code means for serving the generated Web page to the Web client; and computer readable program code means for appending the stored record of the user request with the unique identifier associated with the content object included within the generated Web page.

34. A computer program product according to claim 33 wherein the record of the request includes information that identifies the user.

35. A computer program product according to claim 33 wherein the computer readable program code means for generating the requested Web page comprises:

computer readable program code means for retrieving a layout template for the requested Web page, wherein the layout template defines how content objects are displayed within the requested Web page;

computer readable program code means for retrieving the content object; and computer readable program code means for combining the content object and the layout template to produce the requested Web page.

36. A computer program product according to claim 35 wherein the content object is selected from the group consisting of text files, audio files, video files, image files, and hyperlinks.

37. A computer program product according to claim 33 further comprising computer readable program code means for analyzing a plurality of stored user request records to determine Web content preferences of a user.

38. A computer program product according to claim 33 further comprising computer readable program code means for appending the stored record of the user request with a time stamp for a subsequent user request for a Web page.

39. A computer program product according to claim 38 further comprising computer readable program code means for determining a length of time the user views the generated Web page using time stamps within the stored record.

40. A computer program product for associating dynamically generated Web page content with a user who requests a Web page from a Web server, wherein the user makes the Web page request via a Web client in communication with the Web server, the computer program product comprising a computer usable storage medium having computer readable program code means embodied in the medium, the computer readable program code means comprising:

computer readable program code means for storing a record of the user request within a Web server log;

computer readable program code means for generating the requested Web page, wherein the generated Web page includes first and second content objects having respective unique first and second identifiers associated therewith, wherein the unique first and second identifiers are generated via a hashing function, comprising:

computer readable program code means for retrieving a layout template for the requested Web page, wherein the layout template defines how content objects are displayed within the requested Web page;

computer readable program code means for retrieving the first and second content objects; and computer readable program code means for combining the first and second content objects and the layout template to produce the requested Web page;

computer readable program code means for serving the generated Web page to the Web client; and computer readable program code means for appending the stored record of the user request with the unique first and second identifiers associated with the first and second content objects included within the generated Web page.

41. A computer program product according to claim 40 wherein the record of the request includes information that identifies the user.

42. A computer program product according to claim 40 wherein the first and second content objects are selected from the group consisting of text files, audio files, video files, image files, and hyperlinks.

43. A computer program product according to claim 40 further comprising computer readable program code means for analyzing a plurality of stored user request records to determine Web content preferences of a user.

44. A computer program product for collecting information about the preferences of Web site visitors, the computer program product comprising a computer usable storage medium having computer readable program code means embodied in the medium, the computer readable program code means comprising:

computer readable program code means for associating dynamically generated Web page content with a user who requests a Web page from a Web server via a Web client in communication with the Web server, comprising:

computer readable program code means for storing a record of the user request within a Web server log;

computer readable program code means for generating the requested Web page, wherein the generated Web page includes a content object having a unique identifier associated therewith, wherein the unique identifier is generated via a hashing function;

computer readable program code means for serving the generated Web page to the Web client; and computer readable program code means for appending the stored record of the user request with the unique identifier associated with the content object included within the generated Web page.

45. A computer program product according to claim 44 wherein the record of the request includes information that identifies the user.

46. A computer program product according to claim 44 wherein the computer readable program code means for generating the requested Web page comprises:

computer readable program code means for retrieving a layout template for the requested Web page, wherein the layout template defines how content objects are displayed within the requested Web page;

computer readable program code means for retrieving the content object; and computer readable program code means for combining the content object and the layout template to produce the requested Web page.

47. A computer program product according to claim 46 wherein the content object is selected from the group consisting of text files, audio files, video files, image files, and hyperlinks.

48. A computer program product according to claim 44 further comprising computer readable program code means for analyzing a plurality of stored user request records to determine Web content preferences of a user.

* * * * *